United States Patent
Misu (10) Patent No.: US 10,486,428 B2
(45) Date of Patent: Nov. 26, 2019

(54) IMAGE FORMING APPARATUS AND IMAGE FORMING METHOD

(71) Applicant: KYOCERA Document Solutions Inc., Osaka (JP)

(72) Inventor: Kazuto Misu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/135,002

(22) Filed: Sep. 19, 2018

(65) Prior Publication Data
US 2019/0092033 A1 Mar. 28, 2019

(30) Foreign Application Priority Data
Sep. 22, 2017 (JP) .................. 2017-182412

(51) Int. Cl.
*B41J 2/175* (2006.01)
*G06Q 20/14* (2012.01)

(52) U.S. Cl.
CPC ....... *B41J 2/17546* (2013.01); *B41J 2/17526* (2013.01); *G06Q 20/145* (2013.01); *G06F 2221/2129* (2013.01)

(58) Field of Classification Search
CPC .... B41J 2/17546; B41J 2/17526; B41J 29/38; G06Q 20/145; G06F 2221/2129
USPC .................................. 347/3, 5, 86
See application file for complete search history.

(56) References Cited

U.S. PATENT DOCUMENTS 9,037,007 B2 * 5/2015 Nishikawa ......... G03G 15/0856
399/27
9,864,301 B1 * 1/2018 Ogasahara ......... G03G 15/0856

FOREIGN PATENT DOCUMENTS

JP 2006-276709 A 10/2006

* cited by examiner

*Primary Examiner* — An H Do
(74) *Attorney, Agent, or Firm* — Studebaker & Brackett PC (57) ABSTRACT

An image forming apparatus includes a first determination section, a calculation section, a second determination section, and a billing section. The first determination section determines whether a toner container attached to a toner supply section is a first container or a second container. The calculation section calculates a consumption amount of a toner in the toner container determined as the second container. The second determination section determines whether the consumption amount is a threshold value or larger. When the consumption amount is less than the threshold value, the billing section changes a billing price from a first price to a second price. When the toner container is determined to be the first container, the billing section changes the billing price from the first price to a third price. The second price is lower than the first price. The third price is equal to or lower than the second price.

10 Claims, 10 Drawing Sheets

| Color | Toner container TC | Consumption amount CS | To-be-discounted deduction amount $\Delta G$ (JPY/sheet) |
|---|---|---|---|
| Cyan | First container TC1 | — | 0.5 |
| | Second container TC2 | CS1<CSA | 0.3 |
| | | CS1≥CSA | 0 |
| Magenta | First container TC1 | — | 0.5 |
| | Second container TC2 | CS2<CSA | 0.3 |
| | | CS2≥CSA | 0 |
| Yellow | First container TC1 | — | 0.5 |
| | Second container TC2 | CS3<CSA | 0.3 |
| | | CS3≥CSA | 0 |
| Black | First container TC1 | — | 0.7 |
| | Second container TC2 | CS4<CSA | 0.4 |
| | | CS4≥CSA | 0 |
| Total | First container TC1 | CS5<CSB | 0.5 |
| | | CS5≥CSB | 0 |
| | Second container TC2 | CS6<CSC | 0.2 |
| | | CS6≥CSC | 0 |

IMAGE FORMING APPARATUS AND IMAGE FORMING METHOD

INCORPORATION BY REFERENCE

The present application claims priority under 35 U.S.C. § 119 to Japanese Patent Application No. 2017-182412, filed on Sep. 22, 2017. The contents of this application are incorporated herein by reference in their entirety.

BACKGROUND

The present disclosure relates to an image forming apparatus and an image forming method.

An ink cartridge is attached to an image forming apparatus. The ink cartridge carries an identification (ID) chip. The ID chip stores therein a serial number inherent to the ink cartridge. Upon the ink cartridge being attached to the image forming apparatus, the image forming apparatus determines whether or not the ink cartridge is an official product. If the ink cartridge is not the official product, the image forming apparatus sets a unit price per sheet higher than that set for the official product.

SUMMARY

An image forming apparatus according to an aspect of the present disclosure includes an attachment portion, an image forming section, a first determination section, a first calculation section, a second determination section, and a billing section. A replacement component containing a consumable item is to be attached to the attachment portion. The image forming section forms an image on a recording medium through consumption of the consumable item. The first determination section determines whether the replacement component attached to the attachment portion is a first replacement component or a second replacement component different from the first replacement component. The first calculation section calculates a consumption amount of the consumable item contained in the replacement component when the first determination section determines that the replacement component is the second replacement component. The second determination section determines whether the consumption amount is equal to or larger than a threshold value. When the second determination section determines that the consumption amount is less than the threshold value, the billing section changes a billing price from a first price to a second price. When the first determination section determines that the replacement component is the first replacement component, the billing section changes the billing price from the first price to a third price. The second price is lower than the first price. The third price is equal to or lower than the second price.

An image forming method according to an aspect of the present disclosure is an image forming method implemented by an image forming apparatus including an attachment portion and an image forming section. A replacement component containing a consumable item is to be attached to the attachment portion. The image forming section forms an image on a recording medium through consumption of the consumable item. The image forming method includes: determining whether the replacement component attached to the attachment portion is a first replacement component or a second replacement component different from the first replacement component; calculating a consumption amount of the consumable item contained in the replacement component upon determination that the replacement component is the second replacement component; determining whether the consumption amount is equal to or larger than a threshold value; changing a billing price from a first price to a second price upon determination that the consumption amount is less than the threshold value; and changing the billing price from the first price to a third price upon determination that the replacement component is the first replacement component. The second price is lower than the first price. The third price is equal to or lower than the second price.

BRIEF DESCRIPTION OF THE DRAWINGS

FIGS. 7A and 7B are screen diagrams each illustrating an example of a billing price display screen displayed on a touch panel.

DETAILED DESCRIPTION

Embodiments of the present disclosure will be described below with reference to the accompanying drawings (FIGS. 1-10). It should be noted that elements in the drawings that are the same or equivalent are labelled using the same reference signs and description thereof is not repeated.

Figure 1:
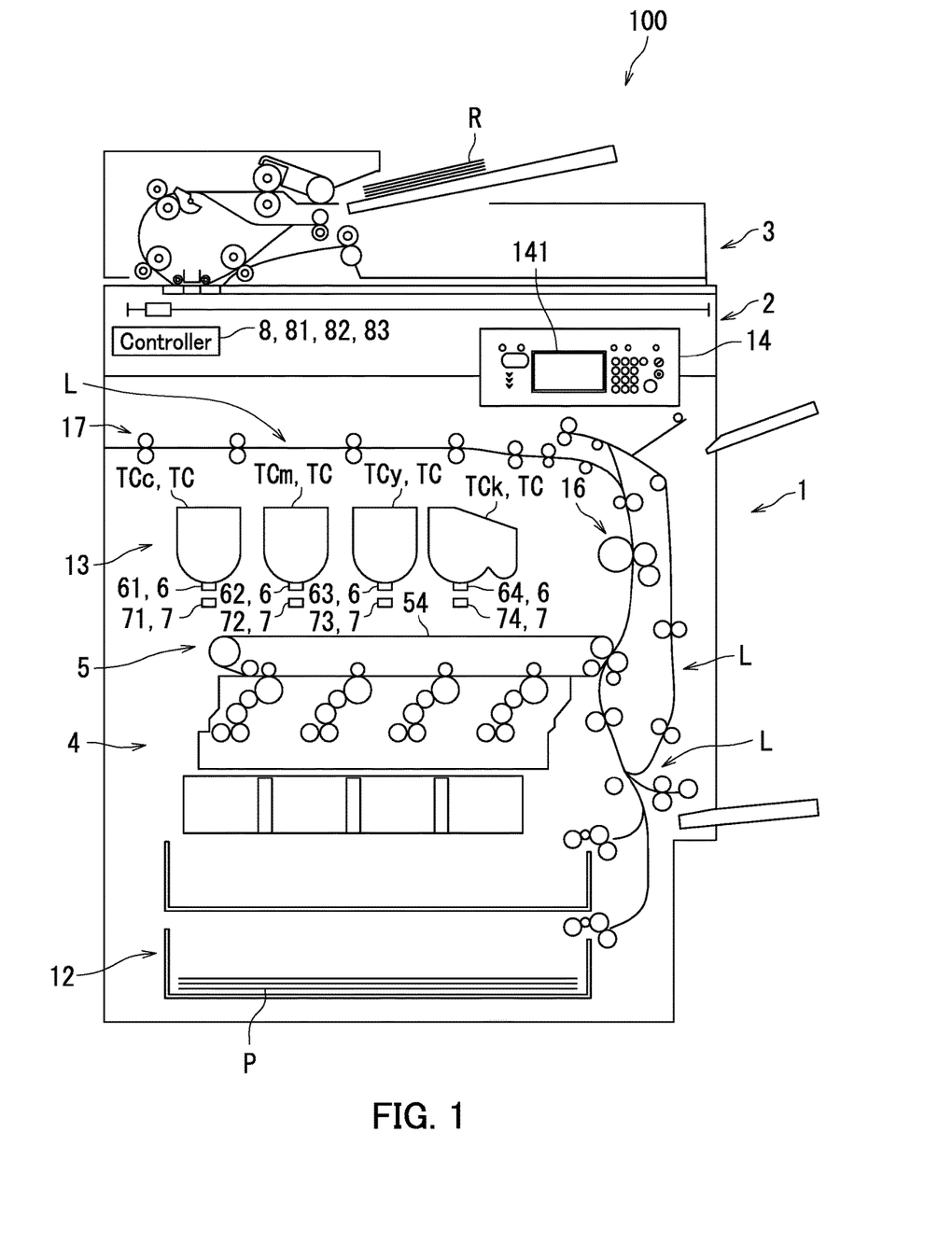
FIG. 1 is a diagram illustrating an example of a configuration of an image forming apparatus according to an embodiment of the present disclosure.

The following describes a configuration of an image forming apparatus 100 according to an embodiment of the present disclosure with reference to FIG. 1. FIG. 1 is a diagram illustrating the configuration of the image forming apparatus 100. The image forming apparatus 100 is a color multifunction peripheral.

As illustrated in FIG. 1, the image forming apparatus 100 includes an image forming unit 1, an image reading unit 2, a document conveyance unit 3, an operation panel 14, and a controller 8. The image forming unit 1 forms an image on paper P. The image reading unit 2 reads an image from a document R and generates image information. The document conveyance unit 3 conveys the document R to the image reading unit 2. The operation panel 14 receives user operation. The controller 8 controls operation of the image forming apparatus 100.

The image forming unit 1 includes a feeding section 12, a conveyance section L, a toner supply section 13, an image forming section 4, a fixing section 16, and an ejection section 17. The image forming section 4 includes a transfer section 5.

The feeding section 12 feeds the paper P to the conveyance section L. The conveyance section L conveys the paper P to the ejection section 17 via the transfer section 5 and the fixing section 16. The paper P is equivalent to an example of a "recording medium".

The toner supply section 13 supplies toner to the image forming section 4. A toner container TCc, a toner container TCm, a toner container TCy, and a toner container TCk are attached to the toner supply section 13. The toner containers TCc to TCk are equivalent to examples of "a plurality of replacement components". In the following description, each of the toner containers TCc to TCk may be referred to generally as a toner container TC. The toner supply section 13 is equivalent to an example of an "attachment portion".

The toner container TCc contains a cyan toner TN1. The toner container TCc supplies the cyan toner TN1 to the image forming section 4. The toner container TCm contains a magenta toner TN2. The toner container TCm supplies the magenta toner TN2 to the image forming section 4. The toner container TCy contains a yellow toner TN3. The toner container TCy supplies the yellow toner TN3 to the image forming section 4. The toner container TCk contains a black toner TN4. The toner container TCk supplies the black toner TN4 to the image forming section 4. The cyan toner TN1, the magenta toner TN2, the yellow toner TN3, and the black toner TN4 each are equivalent to an example of a "consumable item". In the following description, each of the toners TN1 to TN4 may be referred to generally as a toner TN.

The toner container TCc includes an integrated circuit (IC) tag 61. The IC tag 61 is disposed on a circumferential surface of the toner container TCc. The IC tag 61 stores therein identification information JDc of the toner container TCc. The toner container TCm includes an IC tag 62. The IC tag 62 is disposed on a circumferential surface of the toner container TCm. The IC tag 62 stores therein identification information JDm of the toner container TCm.

The toner container TCy includes an IC tag 63. The IC tag 63 is disposed on a circumferential surface of the toner container TCy. The IC tag 63 stores therein identification information JDy of the toner container TCy. The toner container TCk includes an IC tag 64. The IC tag 64 is disposed on a circumferential surface of the toner container TCk. The IC tag 64 stores therein identification information JDk of the toner container TCk. In the following description, each of the IC tags 61 to 64 may be referred to generally as an IC tag 6. Also, the identification information JDc, the identification information JDm, the identification information JDy, and the identification information JDk may each be referred to generally as identification information JD.

The toner containers TCc to TCk are freely attachable to and detachable from the toner supply section 13. The toner supply section 13 includes a reader 71, a reader 72, a reader 73, and a reader 74.

The reader 71 reads the identification information JDc of the toner container TCc from the IC tag 61. The reader 72 reads the identification information JDm of the toner container TCm from the IC tag 62. The reader 73 reads the identification information JDy of the toner container TCy from the IC tag 63. The reader 74 reads the identification information JDk of the toner container TCk from the IC tag 64. In the following description, each of the readers 71 to 74 may be referred to generally as a reader 7.

The image forming section 4 forms an image on the paper P. The transfer section 5 includes an intermediate transfer belt 54. The image forming section 4 transfers toner images in respective colors of cyan, magenta, yellow, and black onto the intermediate transfer belt 54. The toner images in multiple colors are superimposed on the intermediate transfer belt 54, thereby forming an image on the intermediate transfer belt 54. The transfer section 5 transfers the image formed on the intermediate transfer belt 54 onto the paper P. Through the above, the image is formed on the paper P. The image forming section 4 and the transfer section 5 will be described later in detail with reference to FIG. 2.

The fixing section 16 applies heat and pressure to the paper P to fix the image formed on the paper P to the paper P. The ejection section 17 ejects the paper P out of the image forming apparatus 100.

The operation panel 14 includes a touch panel 141. The touch panel 141 includes a liquid crystal display (LCD), for example, and displays various images. The touch panel 141 further includes a touch sensor to receive user operation.

The controller 8 includes a processor 81, storage 82, and an application specific integrated circuit (ASIC) 83. The processor 81 includes for example a central processing unit (CPU). The storage 82 includes memory such as semiconductor memory, and may include a hard disk drive (HDD). The storage 82 stores control programs therein. The ASIC 83 includes a toner counter. The toner counter will be described later in detail with reference to FIG. 3.

Figure 2:
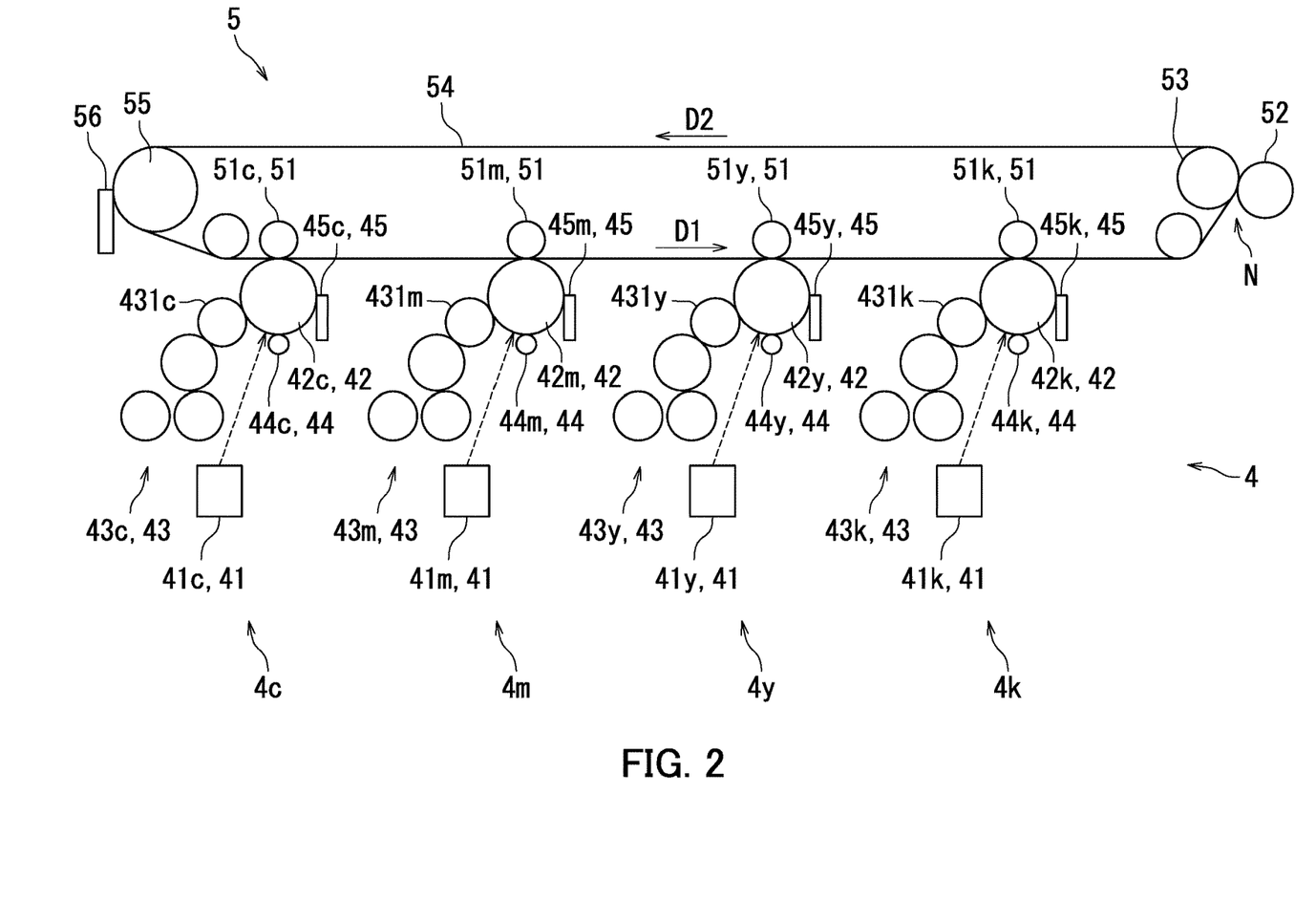
FIG. 2 is a diagram illustrating an example of a configuration of an image forming section according to the embodiment of the present disclosure.

The following describes a configuration of the image forming section 4 according to the embodiment of the present disclosure with reference to FIGS. 1 and 2. FIG. 2 is a diagram illustrating an example of the configuration of the image forming section 4. As illustrated in FIG. 2, the image forming section 4 includes an image forming section 4c, an image forming section 4m, an image forming section 4y, and an image forming section 4k.

Configurations of the image forming sections 4c, 4m, 4y, and 4k are substantially the same as one another other than that colors of the supplied toners TN are different from one another. Therefore, the configuration of only the image forming section 4c to which the cyan toner TN1 is supplied will be described in the following description and description of the configurations of the image forming sections (i.e., image forming sections 4m, 4y, and 4k) other than the image forming section 4c is omitted.

The image forming section 4c includes a light exposure section 41c, a photosensitive drum 42c, a developing section 43c, a charging roller 44c, and a cleaning blade 45c. The image forming section 4m includes a light exposure section 41m, a photosensitive drum 42m, a developing section 43m, a charging roller 44m, and a cleaning blade 45m. The image forming section 4y includes a light exposure section 41y, a photosensitive drum 42y, a developing section 43y, a charging roller 44y, and a cleaning blade 45y. The image forming section 4k includes a light exposure section 41k, a photosensitive drum 42k, a developing section 43k, a charging roller 44k, and a cleaning blade 45k.

In the following description, each of the light exposure sections 41c, 41m, 41y, and 41k may be referred to generally as a light exposure section 41. Each of the photosensitive drums 42c, 42m, 42y, and 42k may be referred to generally as a photosensitive drum 42. Each of the developing sections 43c, 43m, 43y, and 43k may be referred to generally as a developing section 43. Each of the charging rollers 44c, 44m, 44y, and 44k may be referred to generally as a charging roller 44. Each of the cleaning blades 45c, 45m, 45y, and 45k may be referred to generally as a cleaning blade 45.

The charging roller 44c charges the photosensitive drum 42c to a specific potential. The light exposure section 41c irradiates the photosensitive drum 42c with laser light for exposure to form an electrostatic latent image on the photosensitive drum 42c. The developing section 43c includes a development roller 431c. The development roller 431c supplies the cyan toner TN1 onto an irradiated portion of the photosensitive drum 42c to develop the electrostatic latent image into a toner image. Through the above, a cyan toner image is formed on a circumferential surface of the photosensitive drum 42c.

The cleaning blade 45c has a tip end (upper end in FIG. 2) that is in contact with the circumferential surface of the photosensitive drum 42c. The cleaning blade 45c removes cyan toner TN1 remaining on the circumferential surface of the photosensitive drum 42c by sliding the tip end of the cleaning blade 45c on the circumferential surface of the photosensitive drum 42c.

The transfer section 5 transfers toner images onto the paper P. The transfer section 5 includes primary transfer rollers 51, a secondary transfer roller 52, a drive roller 53, the intermediate transfer belt 54, and a driven roller 55. The primary transfer rollers 51 transfer toner images in respective colors of cyan, magenta, yellow, and black from the photosensitive drums 42 to the intermediate transfer belt 54. The primary transfer rollers 51 include a primary transfer roller 51c, a primary transfer roller 51m, a primary transfer roller 51y, and a primary transfer roller 51k.

The drive roller 53 drives the intermediate transfer belt 54. The intermediate transfer belt 54 is an endless belt wound around the primary transfer rollers 51, the drive roller 53, and the driven roller 55. The intermediate transfer belt 54 is rotationally driven by the drive roller 53 in a counterclockwise direction as indicated by arrows D1 and D2. The driven roller 55 is rotationally driven along with rotation of the intermediate transfer belt 54. A blade 56 removes toner TN remaining on a surface of the intermediate transfer belt 54.

The secondary transfer roller 52 is pressed by the drive roller 53 to form a nip part N between the secondary transfer roller 52 and the drive roller 53. The secondary transfer roller 52 transfers the toner images on the intermediate transfer belt 54 onto the paper P while the paper P passes through the nip part N.

Figure 3:
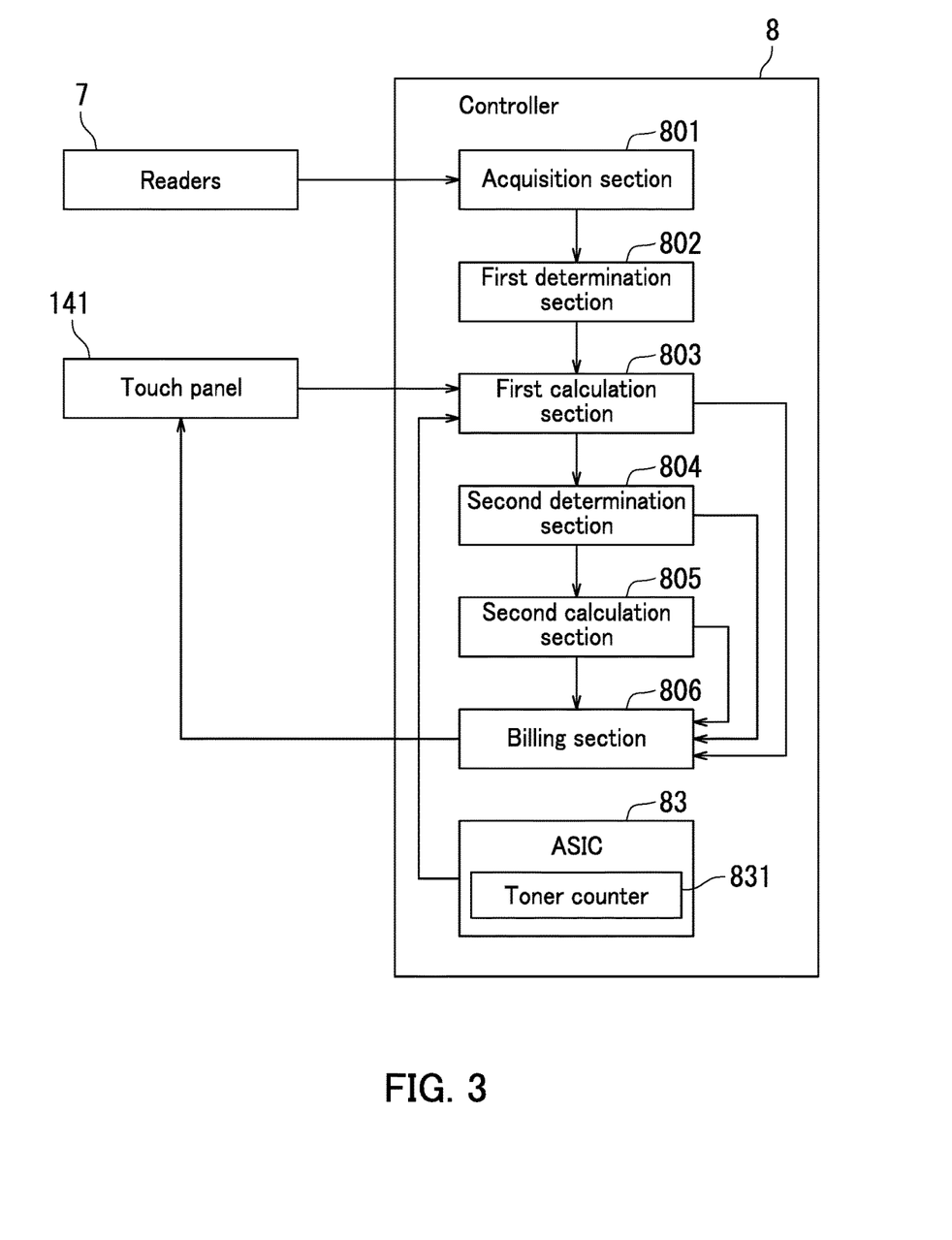
FIG. 3 is a diagram illustrating an example of a configuration of a controller according to the embodiment of the present disclosure.

The following describes a configuration of the controller 8 according to the embodiment of the present disclosure with reference to FIGS. 1 to 3. FIG. 3 is a diagram illustrating an example of the configuration of the controller 8. As illustrated in FIG. 3, the controller 8 includes an acquisition section 801, a first determination section 802, a first calculation section 803, a second determination section 804, a second calculation section 805, and a billing section 806. Specifically, the processor 81 of the controller 8 executes the control programs to function as the acquisition section 801, the first determination section 802, the first calculation section 803, the second determination section 804, the second calculation section 805, and the billing section 806. The ASIC 83 includes a toner counter 831.

The acquisition section 801 acquires the identification information JD of each toner container TC attached to the toner supply section 13 through the readers 7.

The first determination section 802 determines whether each toner container TC attached to the toner supply section 13 is a first container TC1 or a second container TC2. The first container TC1 is for example a dedicated toner container. The second container TC2 is different from the first container TC1. The second container TC2 is for example a toner container TC other than the dedicated toner container. In the following description, the toner container other than the dedicated toner container may be referred to as a non-dedicated toner container.

Once the first determination section 802 determines that the toner container TC is a second container TC2, the first calculation section 803 calculates a consumption amount CS of a toner TN contained in the toner container TC. Specifically, in a situation in which the image forming section 4 forms a monochrome image, the first calculation section 803 acquires a consumption amount CS4 of the black toner TN4 from the toner counter 831.

In a situation in which the image forming section 4 forms a monochrome image, the toner counter 831 calculates a sum of gradation values of all pixels included in image data representing the monochrome image. Specifically, the toner counter 831 calculates a total value SM4 of gradation values for a black color in all the pixels included in the image data. The toner counter 831 then calculates the consumption amount CS4 of the toner TN4 from the total value SM4.

The second determination section 804 determines whether the consumption amount CS is equal to or larger than a first threshold value CSA. Specifically, in a situation in which the image forming section 4 forms a monochrome image, the second determination section 804 determines whether the consumption amount CS4 is equal to or larger than the first threshold value CSA.

Processing by the second calculation section 805 will be described later in detail with reference to FIG. 6.

When the second determination section 804 determines that the consumption amount CS is less than the first threshold value CSA, the billing section 806 changes a billing price G from a first price G1 to a second price G2. The second price G2 is lower than the first price G1. When the first determination section 802 determines that the toner container TC is a first container TC1, the billing section 806 changes the billing price G from the first price G1 to a third price G3. The third price G3 is equal to or lower than the second price G2.

As described with reference to FIGS. 1-3, when the consumption amount CS4 of the toner TN4 is less than the first threshold value CSA even in a situation in which a toner container TC attached to the toner supply section 13 is a second container TC2 (e.g., a non-dedicated toner container), the billing price G is changed from the first price G1 to the second price G2 that is lower than the first price G1 in the embodiment of the present disclosure. In the above configuration, the billing price G is discounted when the consumption amount CS4 of the toner TN4 is less than the first threshold value CSA even in a situation in which a second container TC2 is used. Thus, a user can enjoy benefit.

Furthermore, when the consumption amount CS4 of the toner TN4 is less than the first threshold value CSA even in a situation in which a second container TC2 is used, degradation of components (e.g., the photosensitive drum 42k and the developing section 43k) of the image forming apparatus 100 along with use of the second container TC2 can be inhibited from progressing when compared to a case where the consumption amount CS4 of the toner TN4 is equal to or larger than the first threshold value CSA. As a result, lifetimes of the components of the image forming apparatus 100 can be lengthened. Proper billing to the user can be achieved accordingly.

Figure 4:
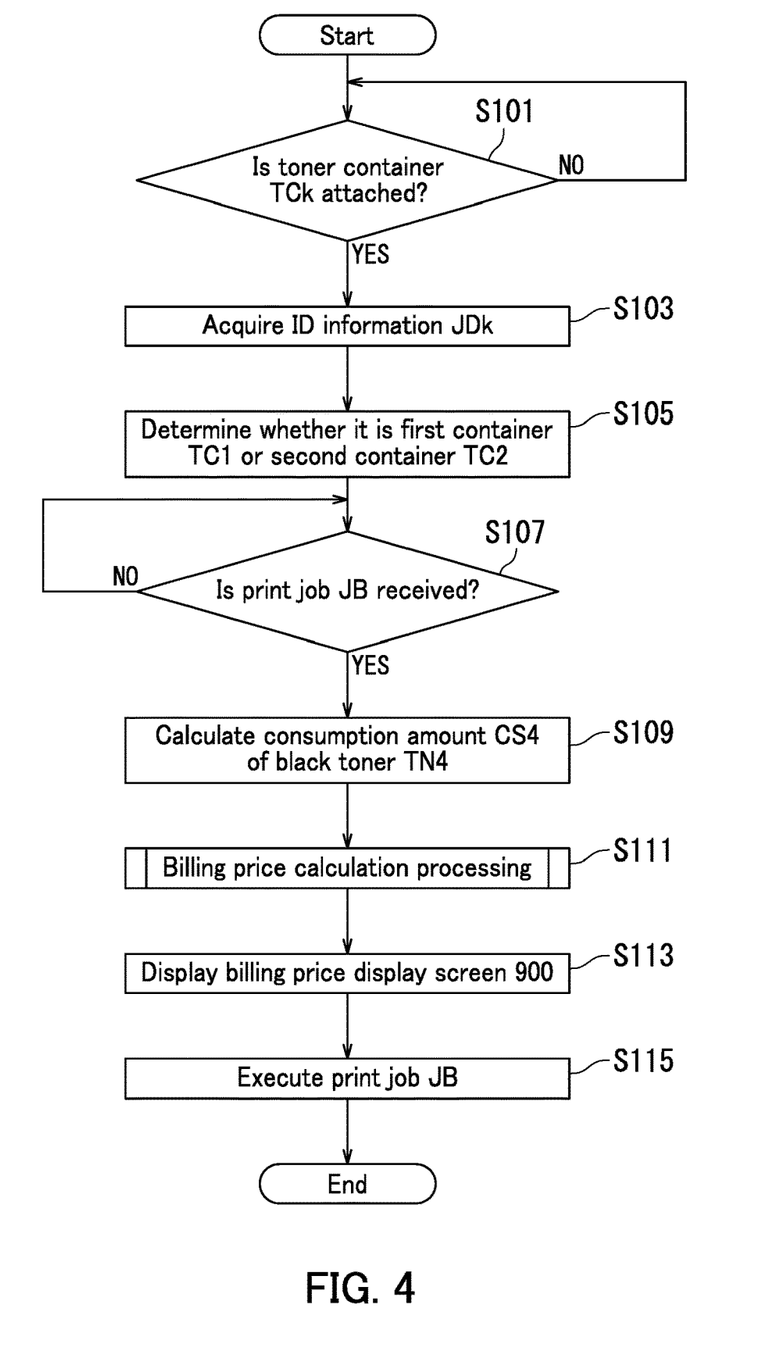
FIG. 4 is a flowchart depicting an example of processing performed by the controller.

The following describes processing performed by the controller 8 with reference to FIGS. 1-5. FIG. 4 is a flowchart depicting an example of the processing performed by the controller 8. Specifically, FIG. 4 depicts the processing performed by the controller 8 in a situation in which the image forming section 4 forms a monochrome image.

As depicted in FIG. 4, the controller 8 first determines whether or not a toner container TCk is attached to the toner supply section 13 at Step S101.

When the controller 8 determines that a toner container TCk is not attached (NO at Step S101), the processing is suspended. When the controller 8 determines that a toner container TCk is attached (YES at Step S101), the processing proceeds to Step S103.

At Step S103, the acquisition section 801 acquires the identification information JDk of the toner container TCk.

Next at Step S105, the first determination section 802 determines whether the toner container TCk is a first container TC1 or a second container TC2.

Subsequently, the controller 8 determines whether or not a print job JB is received at Step S107. The print job JB refers to a job of forming a monochrome image on the paper P.

When the controller 8 determines that the print job JB is not received (NO at Step S107), the processing is suspended. When the controller 8 determines that the print job JB is received (YES at Step S107), the processing proceeds to Step S109.

At Step S109, the first calculation section 803 calculates the consumption amount CS4 of the black toner TN4 contained in the toner container TCk.

Subsequently, the controller 8 performs "billing price calculation processing" at Step S111. The billing price calculation processing refers to processing to determine a price to be billed to the user (billing price G).

Figure 7A:
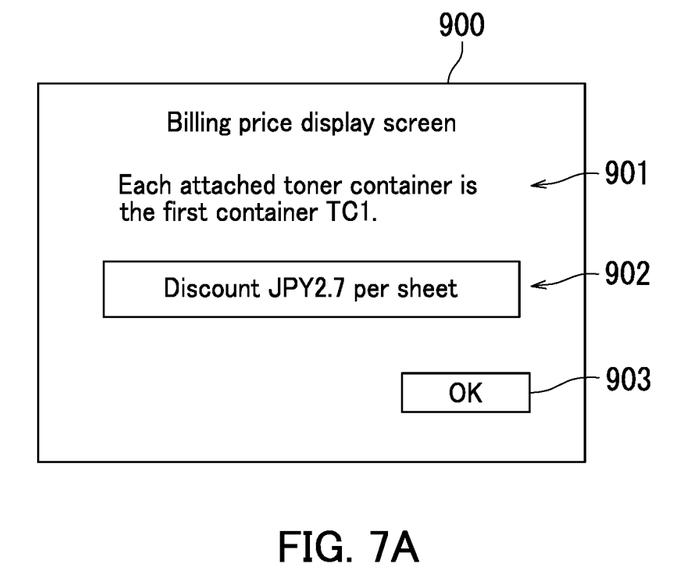
FIG. 7A is a screen diagram illustrating an example of the billing price display screen displayed when a first container is attached.
Figure 7B:
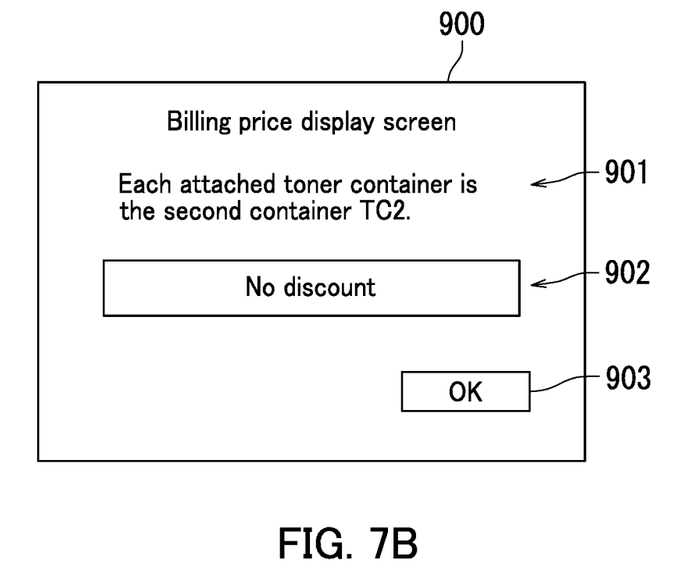
FIG. 7B is a screen diagram illustrating an example of the billing price display screen displayed when a second container is attached.

Next, the billing section 806 causes the touch panel 141 to display a billing price display screen 900 at Step S113. The billing price display screen 900 will be described later in detail with reference to FIG. 7.

The controller 8 then executes the print job JB at Step S115. The processing then ends.

Figure 5:
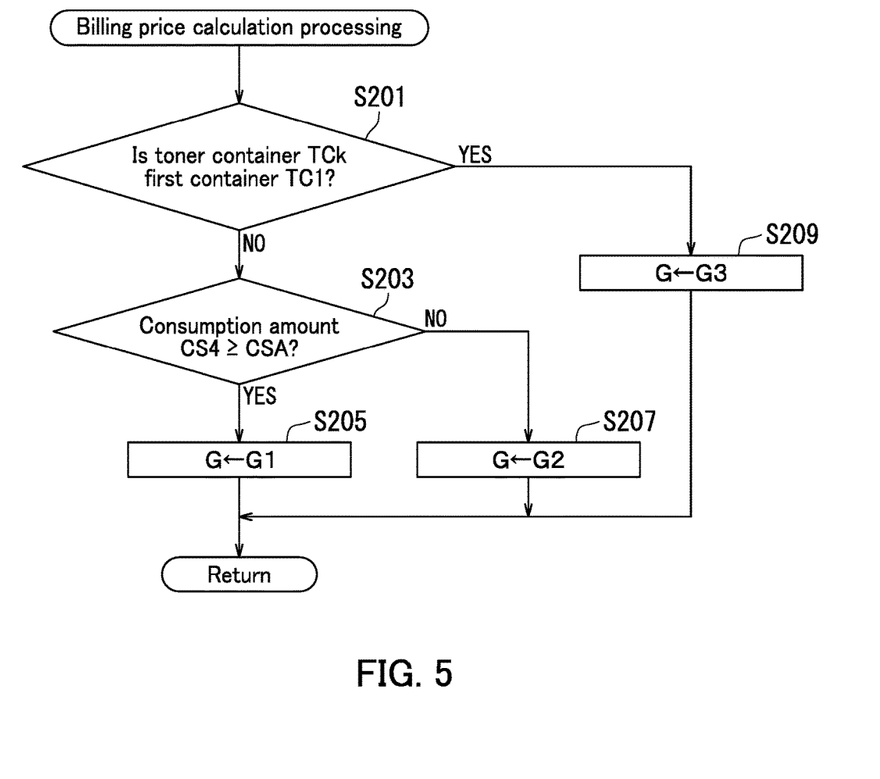
FIG. 5 is a flowchart depicting an example of billing price calculation processing performed by the controller.

FIG. 5 is a flowchart depicting an example of the billing price calculation processing performed by the controller 8. Specifically, FIG. 5 depicts the billing price calculation processing by the controller 8 in a situation in which the image forming section 4 forms a monochrome image.

As depicted in FIG. 5, the billing section 806 first determines whether or not a toner container TCk attached to the toner supply section 13 is a first container TC1 at Step S201.

When the billing section 806 determines that the toner container TCk is a first container TC1 (YES at Step S201), the processing proceeds to Step S209. When the billing section 806 determines that the toner container TCk is not a first container TC1 (NO at Step S201), the processing proceeds to Step S203.

At Step S203, the billing section 806 determines whether the consumption amount CS4 of the black toner TN4 is equal to or larger than the first threshold value CSA.

When the billing section 806 determines that the consumption amount CS4 is equal to or larger than the first threshold value CSA (YES at Step S203), the processing proceeds to Step S205.

At Step S205, the billing section 806 determines the billing price G to be the first price G1. The processing then returns to Step S113 in FIG. 4. The first price G1 is for example JPY10.

When the billing section 806 determines that the consumption amount CS4 is less than the first threshold value CSA (No at Step S203), the processing proceeds to Step S207.

At Step S207, the billing section 806 determines the billing price G to be the second price G2. The processing then returns to Step S113 in FIG. 4. The second price G2 is for example a difference (=JPY9.6) obtained by subtracting JPY0.4 from the first price G1.

When a positive determination is made at Step S201, the billing section 806 determines the billing price G to be the third price G3 at Step S209. The processing then returns to Step S113 in FIG. 4. The third price G3 is equal to or lower than the second price G2. The third price G3 is for example a difference (=JPY9.3) obtained by subtracting JPY0.7 from the first price G1.

Step S105 is equivalent to an example of "determining whether the replacement component attached to the attachment portion is a first replacement component or a second replacement component". Step S109 is equivalent to an example of "calculating a consumption amount of the consumable item". Step S203 is equivalent to an example of "determining whether the consumption amount is equal to or larger than a threshold value". Each of Steps S205, S207, and S209 is equivalent to an example of "changing the billing price".

As described with reference to FIGS. 1-5, when a toner container TCk is determined to be a first container TC1 (e.g., a dedicated toner container) in a situation in which the image forming section 4 forms a monochrome image, the billing price G is changed from the first price G1 to the third price G3 equal to or lower than the second price G2 in the embodiment of the present disclosure. Accordingly, the user can further enjoy benefit when the toner container TCk that is a first container TC1 is used.

In a situation in which a first container TC1 is used, degradation of components (e.g., the photosensitive drum 42k, the developing section 43k, the intermediate transfer belt 54, and the fixing section 16) of the image forming apparatus 100 can be inhibited from progressing. As a result, lifetimes of the components of the image forming apparatus 100 can be lengthened. Furthermore, when the toner container TCk is determined to be a first container TC1, the billing price G is changed from the first price G1 to the third price G3 equal to or lower than the second price G2. Thus, proper billing to the user can be achieved.

When the first determination section 802 determines that the toner container TC is a second container TC2, the billing section 806 determines the billing price G to be the first price G1 or the second price G2 in the embodiment of the present disclosure. However, the present disclosure is not limited to the above. The billing section 806 may hold the third price G3 as the billing price G for a specific time period from replacement of the toner container TC from a first container TC1 to the second container TC2. A high-quality toner contained in the first container TC1 is supplied from the developing sections 43 for the specific time period from replacement of the toner container TC from the first container TC1 to the second container TC2. When the third price G3 is held as the billing price G, the user can further enjoy benefit.

Furthermore, the billing price G indicates a price to be billed in compensation for image formation performed by the image forming section 4 on the paper P in the embodiment of the present disclosure, which however should not be taken to limit the present disclosure. It is only required that the billing price G is a price to be billed in compensation for cost for the image forming apparatus 100. For example, the billing price G may be a price to be billed in compensation for maintenance work performed on the image forming apparatus 100. Alternatively, the billing price G may be a price to be billed in compensation for replacement of a specific replacement component other than the toner containers TCc to TCk. Examples of the specific replacement component include at least one of the photosensitive drums 42, development rollers 431, and the intermediate transfer belt 54.

Figure 6:
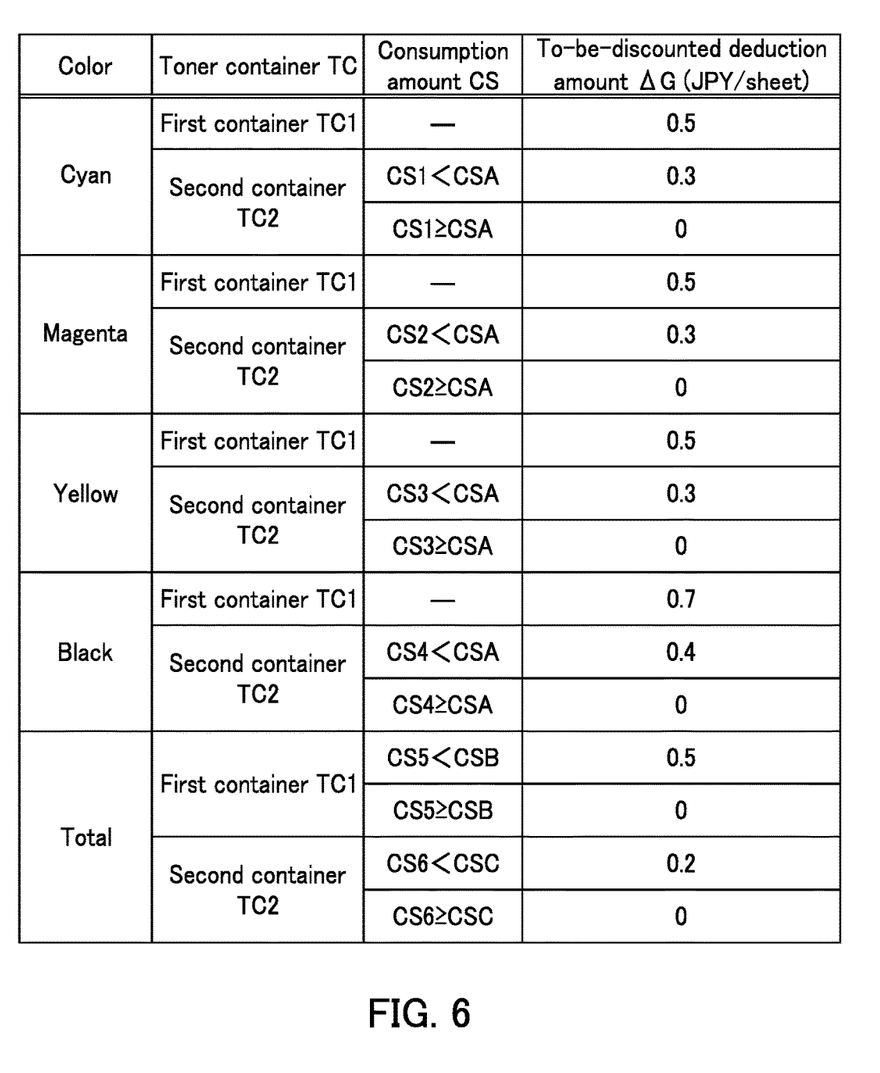
FIG. 6 indicates an example of a relationship between conditions for discount and to-be-discounted deduction amounts.

The following describes a method for determining the billing price G in a situation in which the image forming section 4 forms a full-color image with reference to FIGS. 1-3 and 6. FIG. 6 indicates an example of a relationship between conditions for discount and to-be-discounted deduction amounts ΔG As indicated in FIG. 6, the conditions for discount include the following five conditions.

Condition A: a color of each to-be-consumed toner TN.

Condition B: whether the toner containers TCc to TCk each are a first container TC1 or a second container TC2.

Condition C: whether or not consumption amounts CS1 to CS4 of the toners TN in respective colors each are equal to or larger than the first threshold value CSA.

Condition D: whether or not a total consumption amount CS5 is equal to or larger than a second threshold value CSB.

Condition E: whether or not a total consumption amount CS6 is equal to or larger than a third threshold value CSC.

Note that the "total consumption amount CS5" refers to a sum of a consumption amount CS of a toner TN contained in any toner container TC among the toner containers TCc to TCk that is determined to be a first container TC1. Also, the "total consumption amount CS6" refers to a sum of a consumption amount CS of a toner TN contained in any toner container TC among the toner containers TCc to TCk that is determined to be a second container TC2.

The following describes a case of the cyan toner TN1, for example, as indicated in FIG. 6. When a toner container TCc attached to the toner supply section 13 is a first container TC1, a deduction amount ΔG for cyan color is set at JPY0.5 regardless of the consumption amount CS1 of the cyan toner TN1. Alternatively, for example, when the toner container TCc is a second container TC2 and the consumption amount CS1 of the cyan toner TN1 is equal to or larger than the first threshold value CSA, the deduction amount ΔG for cyan color is set at JPY0 (zero). When the toner container TCc is a second container TC2 and the consumption amount CS1 of the cyan toner TN1 is less than the first threshold value CSA, the deduction amount ΔG for cyan color is set at JPY0.3.

A deduction amount ΔG for magenta color and a deduction amount ΔG for yellow color are respectively set for the magenta toner TN2 and the yellow toner TN3 in the same manner as that for the cyan toner TN1.

The following describes a case of the black toner TN4, for example. When a toner container TCk attached to the toner supply section 13 is a first container TC1, a deduction amount ΔG for black color is set at JPY0.7 regardless of the consumption amount CS4 of the black toner TN4. Alternatively, for example, when the toner container TCk is a second container TC2 and the consumption amount CS4 of the black toner TN4 is equal to or larger than the first threshold value CSA, the deduction amount ΔG for black color is set at JPY0 (zero). When the toner container TCk is a second container TC2 and the consumption amount CS4 of the black toner TN4 is less than the first threshold value CSA, the deduction amount ΔG for black color is set at JPY0.4.

Furthermore, for example, when the total consumption amount CS5 is larger than the second threshold value CSB, a deduction amount ΔG for first containers TC1 is set at JPY0 (zero). In a situation in which the total consumption amount CS5 is less than the second threshold value CSB, the deduction amount ΔG for the first containers TC1 is set at JPY0.5.

Furthermore, for example, when the total consumption amount CS6 is equal to or larger than the third threshold value CSC, a deduction amount ΔG for second containers TC2 is set at JPY0 (zero). When the total consumption amount CS6 is less than the third threshold value CSC, the deduction amount ΔG for the second containers TC2 is set at JPY0.2.

In a situation in which the image forming section 4 forms a full-color image, the first calculation section 803 acquires a consumption amount CS1 of the cyan toner TN1, a consumption amount CS2 of the magenta toner TN2, a consumption amount CS3 of the yellow toner TN3, and a consumption amount CS4 of the black toner TN4 from the toner counter 831.

In a situation in which the image forming section 4 forms a full-color image, the toner counter 831 calculates total gradation values for the respective colors in all pixels included in image data representing the full-color image. Specifically, the toner counter 831 calculates a total value SM1 of gradation values for the cyan color in all the pixels included in the image data. The toner counter 831 calculates a total value SM2 of gradation values for the magenta color in all the pixels included in the image data. The toner counter 831 calculates a total value SM3 of gradation values for the yellow color in all the pixels included in the image data. The toner counter 831 calculates the total value SM4 of gradation values for the black color in all the pixels included in the image data. Then, the toner counter 831 calculates the consumption amount CS1 of the toner TN1 from the total value SM1, the consumption amount CS2 of the toner TN2 from the total value SM2, the consumption amount CS3 of the toner TN3 from the total value SM3, and the consumption amount CS4 of the toner TN4 form the total value SM4.

The second calculation section 805 calculates sums of the consumption amounts CS of the toners TN contained in the respective toner containers TCc to TCk. Specifically, the second calculation section 805 calculates total consumption amounts CS5 and CS6.

The second determination section 804 determines whether the consumption amount CS1 is equal to or larger than the first threshold value CSA, determines whether the consumption amount CS2 is equal to or larger than the first threshold value CSA, determines whether the consumption amount CS3 is equal to or larger than the first threshold value CSA, and determines whether the consumption amount CS4 is equal to or larger than the first threshold value CSA. Furthermore, the second determination section 804 determines whether or not the total consumption amount CS5 is equal to or larger than the second threshold value CSB, and determines whether or not the total consumption amount CS6 is equal to or larger than the third threshold value CSC.

The billing section 806 obtains the respective to-be-discounted deduction amounts ΔG for the cyan toner TN1, the magenta toner TN2, the yellow toner TN3, and the black toner TN4 based on the conditions B and C. The billing section 806 further obtains the respective to-be-discounted deduction amounts ΔG based on the total consumption amounts CS5 and CS6. The billing section 806 calculates the billing price G by subtracting all of the obtained deduction amounts ΔG from the first price G1. A specific calculation method of the billing price G will be described later in detail with reference to FIGS. 9 and 10.

The following describes the billing price display screen 900 that the billing section 806 causes the touch panel 141 to display in a situation in which the image forming section 4 forms a full-color image, with reference to FIGS. 1-3, 6, 7A, and 7B. FIGS. 7A and 7B are screen diagrams each illustrating an example of the billing price display screen 900 displayed on the touch panel 141. The billing price display screen 900 is caused to be displayed by the billing section 806.

FIG. 7A is a screen diagram illustrating an example of the billing price display screen 900 displayed when first containers TC1 are attached to the toner supply section 13. As illustrated in FIG. 7A, a container display area 901, a deduction amount display area 902, and an OK button 903 are displayed on the billing price display screen 900.

Whether each of the toner containers TCc to TCk attached to the toner supply section 13 is a first container TC1 or a second container TC2 is displayed in the container display area 901. For example, "Each attached toner container is a first container TC1." is displayed in the container display area 901.

A to-be-discounted total amount of the deduction amounts ΔG is displayed in the deduction amount display area 902. For example, "Discounted JPY2.7 per sheet" is displayed in the deduction amount display area 902 to indicate that the total amount of the deduction amounts ΔG is JPY2.7 (=0.5× 3+0.7+0.5, see FIG. 6). When the total deduction amount ΔG to be discounted is JPY0 (zero) in a situation in which the image forming section 4 forms a full-color image, the billing section 806 bills JPY30 per sheet, for example. When the deduction amount ΔG is set at JPY2.7, the billing price G is determined to be 27.3 (=30−2.7) per sheet.

The OK button 903 is a button to be touched by the user having confirmed the content displayed on the billing price display screen 900. Once the OK button 903 is touched, the billing section 806 hides the billing price display screen 900.

FIG. 7B is a screen diagram illustrating an example of the billing price display screen 900 displayed when second containers TC2 are attached. As illustrated in FIG. 7B, the container display area 901, the deduction amount display area 902, and the OK button 903 are displayed on the billing price display screen 900.

For example, "Each attached toner container is a second container TC2" is displayed on the container display area 901.

For example, "No discount" is displayed in the deduction amount display area 902 to indicate that the deduction amount ΔG is JPY0 (zero). In this case, the billing price G is determined to be JPY30 per sheet.

As described above with reference to FIGS. 1-3, 6, 7A, and 7B, the billing section 806 causes the touch panel 141 to display the billing price display screen 900, with a result that the user can check the to-be-discounted deduction amount ΔG Thus, user convenience can be improved.

Figure 8:
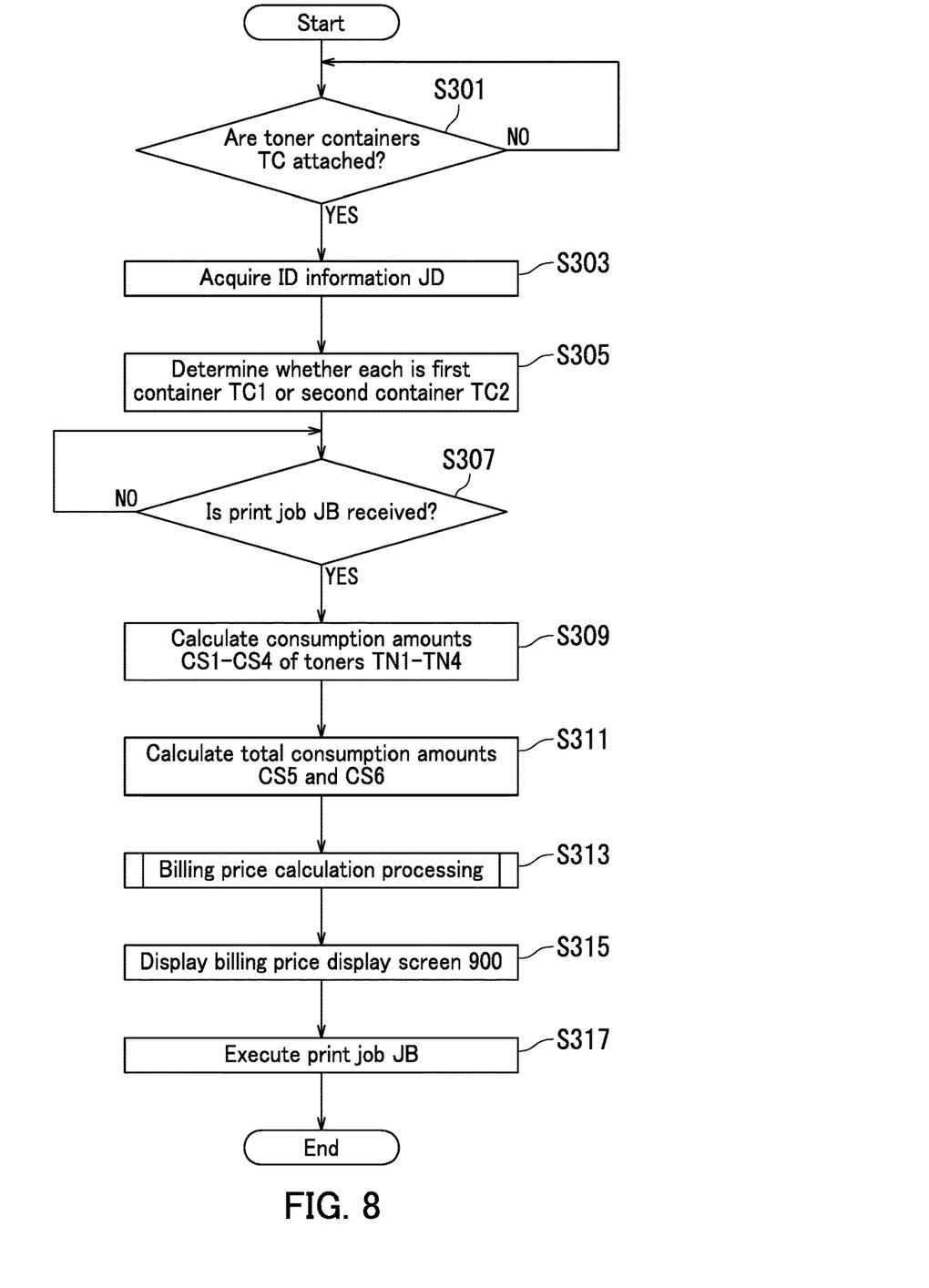
FIG. 8 is a flowchart depicting an example of other processing performed by the controller.

The following describes processing performed by the controller 8 with reference to FIGS. 1-3 and 6-10. FIG. 8 is a flowchart depicting another example of the processing performed by the controller 8. Specifically, FIG. 8 depicts the processing performed by the controller 8 in a situation in which the image forming section 4 forms a full-color image.

As depicted in FIG. 8, the controller 8 first determines whether or not toner containers TC are attached to the toner supply section 33 at Step S301.

When the controller 8 determines that toner containers TC are not attached (NO at Step S301), the processing is suspended. When the controller 8 determines that toner containers TC are attached (YES at Step S301), the processing proceeds to Step S303.

At Step S303, the acquisition section 801 acquires the identification information JD of the respective toner containers TC.

Next at Step S305, the first determination section 802 determines whether each toner container TC is a first container TC1 or a second container TC2.

Next, the controller 8 determines whether or not a print job JB is received at Step S307. The print job JB refers to a job for forming a full-color image on the paper P.

When the controller 8 determines that the print job JB is not received (NO at Step S307), the processing is suspended. When the controller 8 determines that the print job JB is received (YES at Step S307), the processing proceeds to Step S309.

At Step S309, the first calculation section 803 calculates the consumption amount CS1 of the toner TN1, the consumption amount CS2 of the toner TN2, the consumption amount CS3 of the toner TN3, and the consumption amount CS4 of the toner TN4.

Next, at Step S311, the second calculation section 805 calculates the total consumption amounts CS5 and CS6.

Subsequently, the controller 8 performs the billing price calculation processing at Step S313. The billing price calculation processing refers to processing to determine a price (billing price G) to be billed to the user.

Then, at Step S315, the billing section 806 causes the touch panel 141 to display the billing price display screen 900.

At Step S317, the controller 8 then executes the print job JB. The processing then ends.

Figure 9:
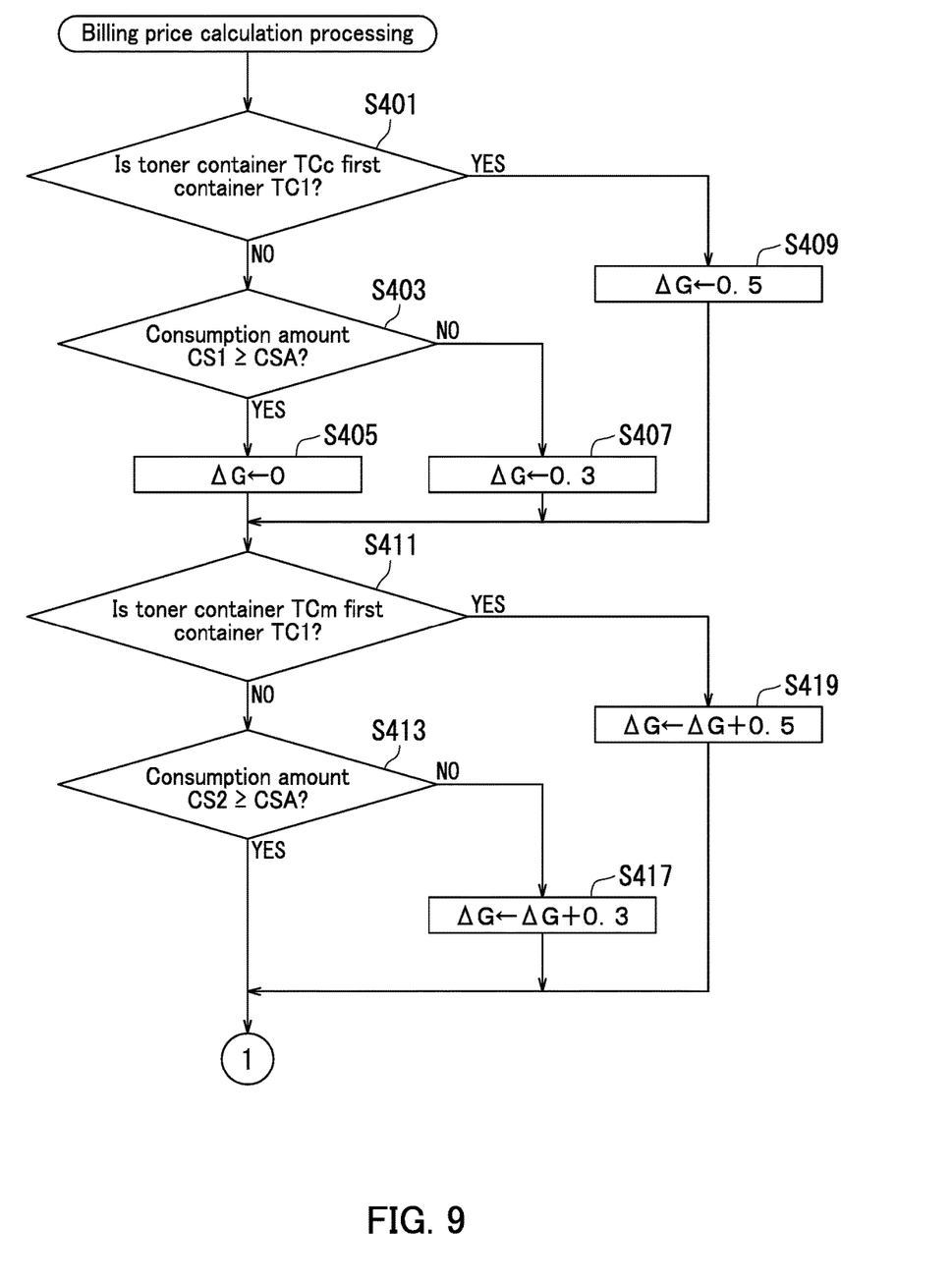
FIG. 9 is a flowchart depicting an example of other billing price calculation processing performed by the controller.
Figure 10:
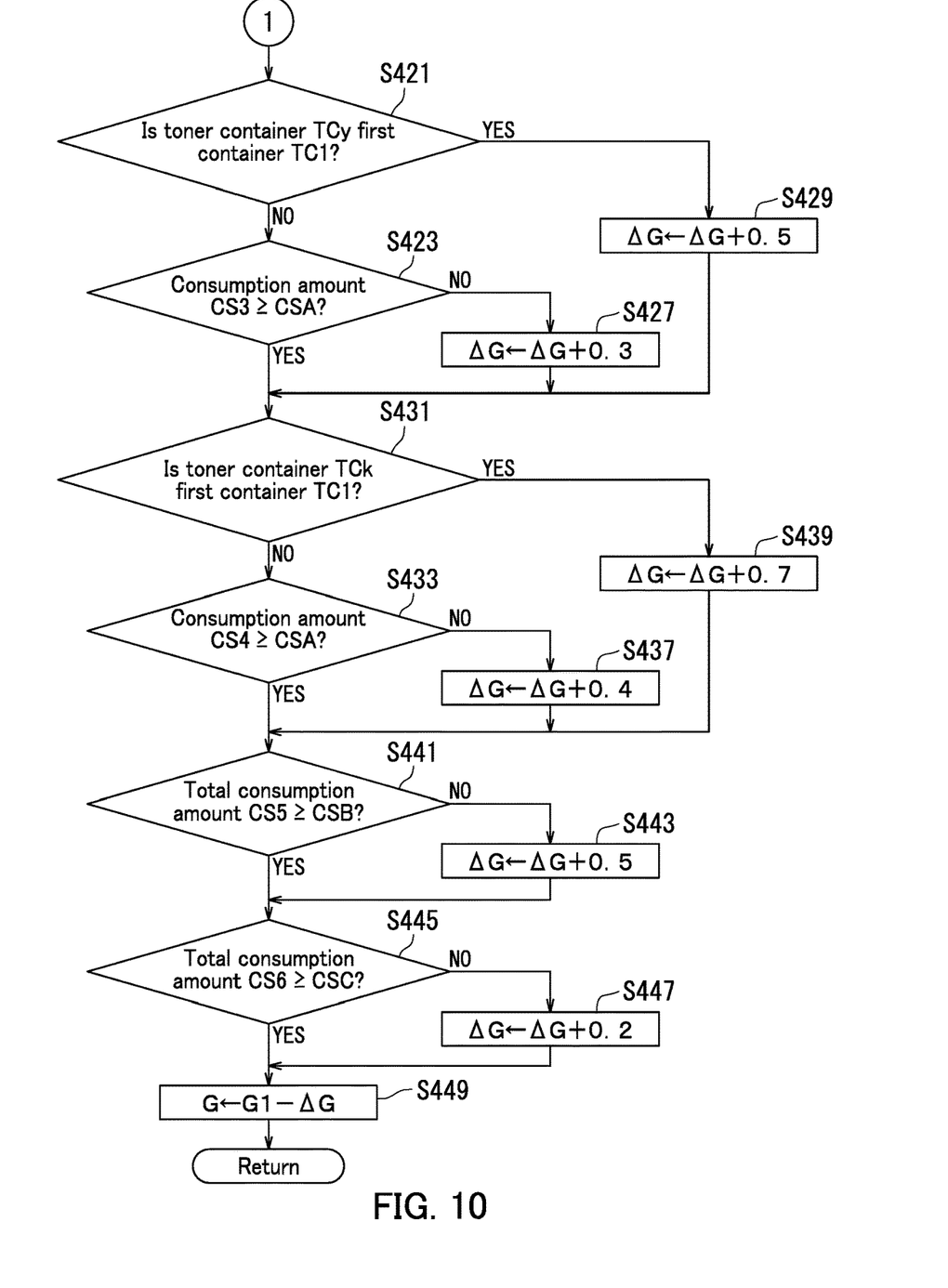
FIG. 10 is a flowchart further depicting the example of the other billing price calculation processing performed by the controller.

FIGS. 9 and 10 each are a flowchart depicting an example of other billing price calculating processing performed by the controller 8. Specifically, FIGS. 9 and 10 depict the billing price calculation processing performed by the controller 8 in a situation in which the image forming section 4 forms a full-color image.

As depicted in FIG. 9, the billing section 806 first determines whether or not a toner container TCc attached to the toner supply section 13 is a first container TC1 at Step S401.

When the billing section 806 determines that the toner container TCc is a first container TC1 (YES at Step S401), the processing proceeds to Step S409.

At Step S409, the billing section 806 sets a deduction amount ΔG at JPY0.5. The processing then proceeds to Step S411.

When the billing section 806 determines that the toner container TCc is not a first container TC1 (NO at Step S401), the processing proceeds to Step S403.

As Step S403, the billing section 806 determines whether the consumption amount CS1 of the cyan toner TN1 is equal to or larger than the first threshold value CSA.

When the billing section 806 determines that the consumption amount CS1 is equal to or larger than the first threshold value CSA (YES at Step S403), the processing proceeds to Step S405.

At Step S405, the billing section 806 sets the deduction amount ΔG at JPY0. The processing then proceeds to Step S411.

When the billing section 806 determines that the consumption amount CS1 is less than the first threshold value CSA (No at Step S403), the processing proceeds to Step S407.

At Step S407, the billing section 806 sets the deduction amount ΔG at JPY0.3. The processing then proceeds to Step S411.

At Step S411, the billing section 806 determines whether or not a toner container TCm attached to the toner supply section 13 is a first container TC1.

When the billing section 806 determines that the toner container TCm is a first container TC1 (YES at Step S411), the processing proceeds to Step S419.

At Step S419, the billing section 806 adds JPY0.5 to the current deduction amount ΔG The processing then proceeds to Step S421 in FIG. 10.

When the billing section 806 determines that the toner container TCm is not a first container TC1 (NO at Step S411), the processing proceeds to Step S413.

At Step S413, the billing section 806 determines whether the consumption amount CS2 of the magenta toner TN2 is equal to or larger than the first threshold value CSA.

When the billing section 806 determines that the consumption amount CS2 is equal to or larger than the first threshold value CSA (YES at Step S413), the processing proceeds to Step S421 in FIG. 10. When the billing section 806 determines that the consumption amount CS2 is less than the first threshold value CSA (NO at Step S413), the processing proceeds to Step S417.

At Step S417, the billing section 806 adds JPY0.3 to the current deduction amount ΔG The processing then proceeds to Step S421 in FIG. 10.

Subsequently, as depicted in FIG. 10, the billing section 806 determines whether or not a toner container TCy is a first container TC1 at Step S421.

When the billing section 806 determines that the toner container TCy is a first container TC1 (YES at Step S421), the processing proceeds to Step S429.

At Step S429, the billing section 806 adds JPY0.5 to the current deduction amount ΔG The processing then proceeds to Step S431.

When the billing section 806 determines that the toner container TCy is not a first container TC1 (NO at Step S421), the processing proceeds to Step S423.

At Step S423, the billing section 806 determines whether the consumption amount CS3 of the yellow toner TN3 is equal to or larger than the first threshold value CSA.

When the billing section 806 determines that the consumption amount CS3 is equal to or larger than the first threshold value CSA (YES at Step S423), the processing proceeds to Step S431. When the billing section 806 determines that the consumption amount CS3 is less than the first threshold value CSA (NO at Step S423), the processing proceeds to Step S427.

At Step S427, the billing section 806 adds JPY0.3 to the current deduction amount ΔG The processing then proceeds to Step S431.

At Step S431, the billing section 806 determines whether or not a toner container TCk attached to the toner supply section 13 is a first container TC1.

When the billing section 806 determines that the toner container TCk is a first container TC1 (YES at Step S431), the processing proceeds to Step S439.

At Step S439, the billing section 806 adds JPY0.7 to the current deduction amount ΔG The processing then proceeds to Step S441.

When the billing section 806 determines that the toner container TCk is not a first container TC1 (NO at Step S431), the processing proceeds to Step S433.

At Step S433, the billing section 806 determines whether the consumption amount CS4 of the black toner TN4 is equal to or larger than the first threshold value CSA.

When the billing section 806 determines that the consumption amount CS4 is equal to or larger than the first threshold value CSA (YES at Step S433), the processing proceeds to Step S441. When the billing section 806 determines that the consumption amount CS4 is less than the first threshold value CSA (NO at Step S433), the processing proceeds to Step S437.

At Step S437, the billing section 806 adds JPY0.4 to the current deduction amount ΔG. The processing then proceeds to Step S441.

At Step S441, the billing section 806 determines whether or not the total consumption amount CS5 of the consumption amounts CS in any toner containers TC each determined to be a first container TC1 is equal to or larger than the second threshold value CSB.

When the billing section 806 determines that the total consumption amount CS5 is equal to or larger than the second threshold value CSB (YES at Step S441), the processing proceeds to Step S445. When the billing section 806 determines that the total consumption amount CS5 is less than the second threshold value CSB (NO at Step S441), the processing proceeds to Step S443.

At Step S443, the billing section 806 adds JPY0.5 to the current deduction amount ΔG.

At Step S445, the billing section 806 determines whether or not the total consumption amount CS6 of the consumption amounts CS in any toner containers TC each determined as a second container TC2 is equal to or larger than the third threshold value CSC.

When the billing section 806 determines that the total consumption amount CS6 is equal to or larger than the third threshold value CSC (YES at Step S445), the processing proceeds to Step S449. When the billing section 806 determines that the total consumption amount CS6 is less than the third threshold value CSC (NO at Step S445), the processing proceeds to Step S447.

At Step S447, the billing section 806 adds JPY0.2 to the current deduction amount ΔG.

At Step S449, the billing section 806 determines a difference obtained by subtracting the respective deduction amounts ΔG from the first price G1 as the billing price G The processing then returns to Step S315 in FIG. 8. The first price G1 is for example JPY30 per sheet.

Step S305 is equivalent to an example of "determining whether or not the replacement component attached to the attachment portion is a first replacement component or a second replacement component". Step S309 is equivalent to an example of "calculating". Steps S403, S413, S423, and S433 each are equivalent to an example of "determining whether the consumption amount is equal to or larger than a threshold value". Step S449 is equivalent to an example of "changing".

As described with reference to FIGS. 1-3 and 6-10, whether the toner containers TCc to TCk each are a first container TC1 or a second container TC2 is determined in the embodiment of the present disclosure. The billing price G is determined according to results of determination. For example, when each of the toner containers TCc to TCk is a first container TC1 (e.g., a dedicated toner container), the billing price G is determined to be a price (e.g., JPY27.3 (=30−2.7) per sheet) lower by JPY2.7 (=0.5×3+0.7+0.5) than the first price G1 (e.g., JPY30 per sheet). Thus, the user can further enjoy benefit when each of the toner containers TCc to TCk is a first container TC1.

When each of the toner containers TCc to TCk is a first container TC1, degradation of components (e.g., the photosensitive drums 42c to 42k, the developing sections 43c to 43k, the intermediate transfer belt 54, and the fixing section 16) of the image forming apparatus 100 can be inhibited from progressing, thereby lengthening lifetimes of the components of the image forming apparatus 100.

Furthermore, in a situation in which at least one toner container TC of toner containers TC attached to the toner supply section 13 is determined as a second container TC2, the billing price G is determined according to whether or not a consumption amount CS of a toner TN contained in the toner container TC is equal to or larger than the first threshold value CSA. In the above configuration, even in a situation in which each of the toner containers TCc to TCk is determined as a second container TC2, the user can enjoy benefit when a consumption amount CS of a toner TN contained in at least one of the toner containers TC that is determined as a second container TC2 is less than the first threshold value CSA.

Moreover, even in a situation in which toner containers TC attached to the toner supply section 13 are each determined as a second container TC2, progress of degradation of components (e.g., photosensitive drums 42 and developing sections 43) of the image forming apparatus 100 in association with use of second containers TC2 can be slowed down when at least one of consumption amounts CS of the toners TN contained in the respective toner containers TC each determined as a second container TC2 is less than the first threshold value CSA. As a result, lifetimes of the components of the image forming apparatus 100 can be lengthened. Furthermore, the billing price G is determined according to whether or not at least one of the consumption amounts CS of toners TN contained in toner containers TC each determined as a second container TC2 is equal to or larger than the first threshold value CSA. Thus, more proper billing to the user can be achieved.

Still, the black toner TN4 is used in both full-color image formation and monochrome image formation. As such, in a configuration in which the billing price G is determined according to whether or not the color of a toner TN contained in at least one of the toner containers TC determined as a second container TC2 is black, more proper billing to the user can be achieved.

The less the total consumption amount CS6 is, the more progress of degradation of components (e.g., the intermediate transfer belt 54 and the fixing section 16) of the image forming apparatus 100 in association with use of one or more second containers TC2 can be slowed down. The total consumption amount CS6 indicates a sum of the consumption amounts CS of toners TN contained in any toner containers TC determined as second containers TC2. As a result, lifetimes of the components of the image forming apparatus 100 can be lengthened. Moreover, the billing price G is determined based on the total consumption amount CS6. Thus, more proper billing to the user can be achieved.

The less the total consumption amount CS5 is, the more progress of degradation of components (e.g., the intermediate transfer belt 54 and the fixing section 16) of the image forming apparatus 100 can be slowed down. The total consumption amount CS2 indicates a sum of the consumption amount CS of a toner TN of each first container TC1. As a result, lifetimes of the components of the image forming apparatus 100 can be lengthened. Still, the billing price G is determined based on the total consumption amount CS5. Thus, more proper billing to the user can be achieved.

Note that the same first threshold value CSA is set for each of the consumption amounts CS1, CS2, CS3, and CS4 in the embodiment of the present disclosure, which however should not be taken to limit the present disclosure. Different threshold values may be set for the consumption amounts CS1, CS2, CS3, and CS4.

The billing price G is determined based on the total consumption amounts CS5 and CS6 in the embodiment of the present disclosure, which however should not be taken to limit the present disclosure. The billing price G may be determined based on a sum of the total consumption amounts CS5 and CS6 (i.e., a sum of the consumption amounts CS1 to CS4). The processing is simplified in the above configuration.

An embodiment of the present disclosure has been described so far with reference to the drawings. However, the present disclosure is not limited to the above-described embodiment and can be practiced in various ways within the scope not departing from the gist of the present disclosure (e.g., (1) to (4) described below). The drawings are intended to mainly illustrate elements of configuration in a schematic manner to assist with understanding. The thickness, the length, the number, and so on of each element of configuration illustrated are not true to scale for diagrammatic purposes. The shape, the dimension, and so on of each element of configuration shown in the above-described embodiment are exemplary only and not particularly limited. Various alternations can be made thereto within the scope not substantially departing from the configuration of the present disclosure.

(1) As described with reference to FIGS. 1 and 2, the "consumable item" is toner in the embodiment of the present disclosure and the "replacement component" is a toner container TC, which however should not be taken to limit the present disclosure. It is only required that an image is formed on the paper P through consumption of the "consumable item". For example, the consumable item may be an ink and the replacement component may be an ink cartridge. In the above case, the "image forming apparatus" is an inkjet recording apparatus.

(2) As described with reference to FIGS. 1 and 2, the image forming apparatus 100 is a color multifunction peripheral in the embodiment of the present disclosure, which however should not be taken to limit the present disclosure. It is only required that the image forming apparatus 100 forms an image on the paper P. For example, the image forming apparatus 100 may be a monochrome multifunction peripheral or a color printer.

(3) As described with reference to FIGS. 1-3, the first container TC1 is a dedicated toner container and the second container TC2 is a non-dedicated toner container in the embodiment of the present disclosure, which however should not be taken to limit the present disclosure. It is only required that the first container TC1 contains a "high-quality" toner and the second container TC2 contains an "ordinary-quality" toner. The "high-quality" toner is higher in quality than the "ordinary-quality" toner.

(4) The third price G3 is less than the second price G2 in the embodiment of the present disclosure as described with reference to FIGS. 1-5. However, it is only required that the third price G3 be equal to or lower than the second price G2. For example, the third price G3 may be the same as the second price G2.

What is claimed is:
1. An image forming apparatus comprising:
an attachment portion to which a replacement component containing a consumable item is to be attached;
an image forming section configured to form an image on a recording medium through consumption of the consumable item;

a first determination section configured to determine whether the replacement component attached to the attachment portion is a first replacement component or a second replacement component different from the first replacement component;

a first calculation section configured to calculate a consumption amount of the consumable item contained in the replacement component when the first determination section determines that the replacement component is the second replacement component;

a second determination section configured to determine whether the consumption amount is equal to or larger than a threshold value; and a billing section configured to change a billing price from a first price to a second price when the second determination section determines that the consumption amount is less than the threshold value, wherein when the first determination section determines that the replacement component is the first replacement component, the billing section changes the billing price from the first price to a third price, the second price is lower than the first price, and the third price is equal to or lower than the second price.

2. The image forming apparatus according to claim 1, wherein a plurality of replacement components that contain consumable items are attached to the attachment portion, the replacement component and at least one additional replacement component together forming the plurality of replacement components, colors of the consumable items being different from each other, the image forming section is enabled to form a color image on a recording medium through consumption of the consumable items different in color, the first determination section determines whether the replacement components each are the first replacement component or the second replacement component, and the billing section determines the billing price according to a result of determination by the first determination section.

3. The image forming apparatus according to claim 2, wherein when the first determination section determines that at least one of the replacement components is the second replacement component, the first calculation section calculates a consumption amount of a consumable item among the consumable items that is contained in the at least one replacement component, the second determination section determines whether the consumption amount of the consumable item contained in the at least one replacement component is equal to or larger than the threshold value, and the billing section determines the billing price according to a result of determination by the second determination section.

4. The image forming apparatus according to claim 3, wherein the colors of the consumable items include a black color, the second determination section performs additional determination as to whether or not a color of the consumable item contained in the at least one replacement component is the black color, and the billing section determines the billing price according to a result of the additional determination by the second determination section.

5. The image forming apparatus according to claim 3, further comprising a second calculation section configured to calculate a sum of consumption amounts of the consumable items contained in the respective replacement components, and the billing section determines the billing price based on the sum of the consumption amounts.

6. The image forming apparatus according to claim 1, wherein when the first determination section determines that another replacement component replaced by the replacement component is the second replacement component after the billing section changes the billing price from the first price to the third price according to determination by the first determination section that the replacement component is the first replacement component, the billing section holds the third price as the billing price for a specific period.

7. The image forming apparatus according to claim 1, wherein the billing price indicates at least one of a price to be billed in compensation for image formation performed by the image forming section on the recording medium, a price to be billed in compensation for maintenance work performed on the image forming apparatus, and a price to be billed in compensation for replacement of a specific replacement component different from the replacement components.

8. The image forming apparatus according to claim 1, further comprising a display, wherein the billing section causes the display to display the billing price.

9. The image forming apparatus according to claim 1, wherein the first replacement component contains a high-quality consumable item, the second replacement component contains an ordinary-quality consumable item, the high-quality consumable item is higher in quality than the ordinary-quality consumable item.

10. An image forming method implemented by an image forming apparatus that includes an attachment portion to which a replacement component containing a consumable item is to be attached and an image forming section that forms an image on a recording medium through consumption of the consumable item, the method comprising:

determining whether the replacement component attached to the attachment portion is a first replacement component or a second replacement component different from the first replacement component;

calculating a consumption amount of the consumable item contained in the replacement component upon determination that the replacement component is the second replacement component;

determining whether the consumption amount is equal to or larger than a threshold value;

changing a billing price from a first price to a second price upon determination that that the consumption amount is less than the threshold value; and changing the billing price from the first price to a third price upon determination that the replacement component is the first replacement component, the second price is lower than the first price, and the third price is equal to or lower than the second price.

* * * * *